Figure 1:
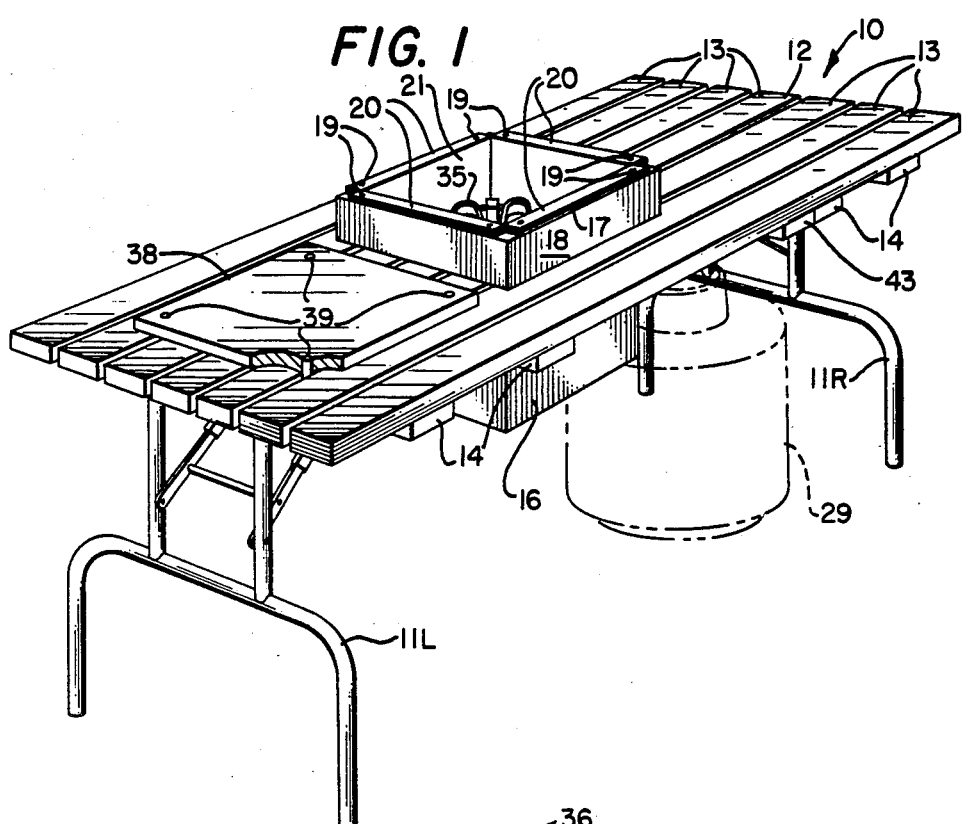

United States Patent [19]

Segroves

[11] Patent Number: 4,635,614
[45] Date of Patent: Jan. 13, 1987

[54] DEEP FAT FRYING POT COOKER HOLDING AND PICNIC TABLE

[76] Inventor: James L. Segroves, 3025 Chisholm Trail, Garland, Tex. 75042

[21] Appl. No.: 882,243

[22] Filed: Jul. 7, 1986

[51] Int. Cl.⁴ ............................................. A47J 37/00
[52] U.S. Cl. ................................. 126/41 R; 126/25 R
[58] Field of Search ............ 126/41 R, 40.39 R, 25 R, 126/27.39 C, 299 R, 299 D, 214 R, 214 A, 215, 212.19 R; 98/115.1; 99/446, 447, 444

[56] References Cited

U.S. PATENT DOCUMENTS

| | | | |
|---|---|---|---|
| 2,566,440 | 9/1951 | Beynon | 126/214 A |
| 3,002,513 | 10/1961 | Morasch | 126/299 R |
| 3,322,060 | 5/1967 | Gilbert | 126/41 R |
| 3,964,463 | 6/1976 | Dailey | 126/41 R |
| 4,335,705 | 6/1982 | Kiyomitu | 126/41 R |
| 4,582,046 | 4/1986 | Yamada | 126/41 R |
| 4,603,684 | 8/1986 | Kazuo et al. | 126/299 R |

Primary Examiner—James C. Yeung
Attorney, Agent, or Firm—Warren H. Kintzinger

[57] ABSTRACT

A picnic table having a table top extending over and between sturdy support opposite end legs with a pot cooker mounted on and extending through an opening in the table top at a location between the opposite end legs. The pot cooker structure has a rectangular box shaped metal shield and support container having top flanges that extend out over the top of a square frame of wood resting on the table top around the table top opening through which the box extends to below the table top. The box is provided with a side opening therein in the portion thereof that extends below the table top for passage of air therethrough and extension of a propane gas line therethrough from a propane gas bottle mounted with a chain connected to the bottom of the table top. A cylindrical gas burner element holder is also provided with a side opening for passing of air and the propane gas line therethrough that extends to a gas burner supported on a plate of a gas burner support suspended down in cylindrical gas burner element holder by flanged top extensions that overlap the top rim of the cylindrical holder. A serpentine cooking grill rests on the top rim of the cylindrical holder to support a pot with the pot bottom well down in the cooker box. A cover formed of wood is useable as a chopping block when not covering the top of the cooker box.

16 Claims, 4 Drawing Figures

U.S. Patent  Jan. 13, 1987  Sheet 1 of 2  4,635,614

DEEP FAT FRYING POT COOKER HOLDING AND PICNIC TABLE

This invention relate in general to outdoor cooking devices, and more particularly, to a picnic table mounted deep fat frying pot cooker.

Outdoor deep fat frying pot cookers such as used for frying fish are widely used and found to be used on many different stands and mounting structures. In the picnic environment people many times are moving around, particularly children, and such cookers have been known to have been knocked over. With a pot cooker full of hot fluid fat or cooking oil the burn injury potential particularly to children is most certainly not desired. There is also a fire hazard with the spillage of hot inflammable fluid cooking fats and oils.

It is therefore a principal object of this invention is to provide a table mounted deep fat frying pot cooker convenient, easy and reliable in use.

Another object is to provide such a table mounted deep fat frying pot cooker that is much safer in use than with stand mounted pot cookers.

A further object is to provide such a pot cooker with a wood cover useable as a food chopping block when removed from the top of pot container and placed on the table top.

Still another object is for the table to be so sized and shaped as to also serve as a picnic table.

Features of the invention useful in accomplishing the above objects include, in a deep fat frying pot cooker mounted in a picnic table, a rectangular open topped rectangular metal box having outward extending flanges at the top supported on a square frame of wood resting on the table top around a table top square opening through which the box extends to well below the table top. A side opening in the box below the table top provides for inflow of air and extension of a gas line therethrough from a propane gas bottle mounted with a chain to the table top bottom. A cylindrical gas burner element holder that rests on the bottom of the box is also provided with a side opening for inflow of air and passage of the propane gas line therethrough. The gas line extends to a gas burner that is supported on a plate of a gas burner element support suspended in the cylindrical gas burner element holder by flanged top extensions that overlap the top rim of the cylindrical holder. A serpenting cooking grill resting on the top rim of the cylindrical holder supports a deep fat fry pot from well down in the cooker box. A cover, for the cooker box, formed of wood is also useable as a food chopping block when not covering the top of the cooker box.

A specific embodiment representing what is presently regarded as the best mode of carrying out the invention is illustrated in the accompanying drawings.

Figure 2:
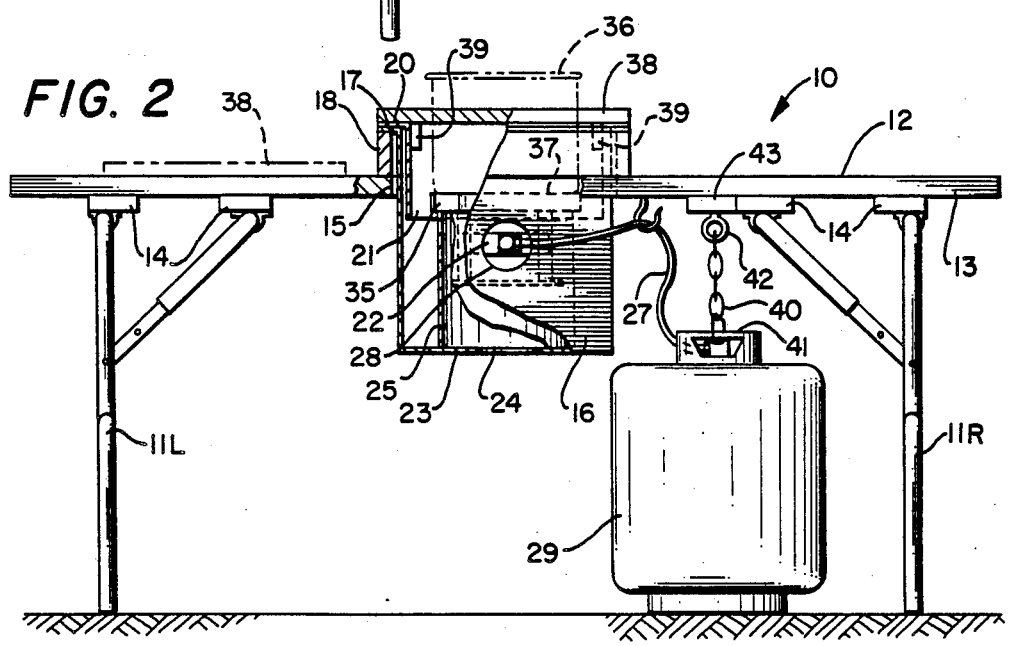
Figure 3:
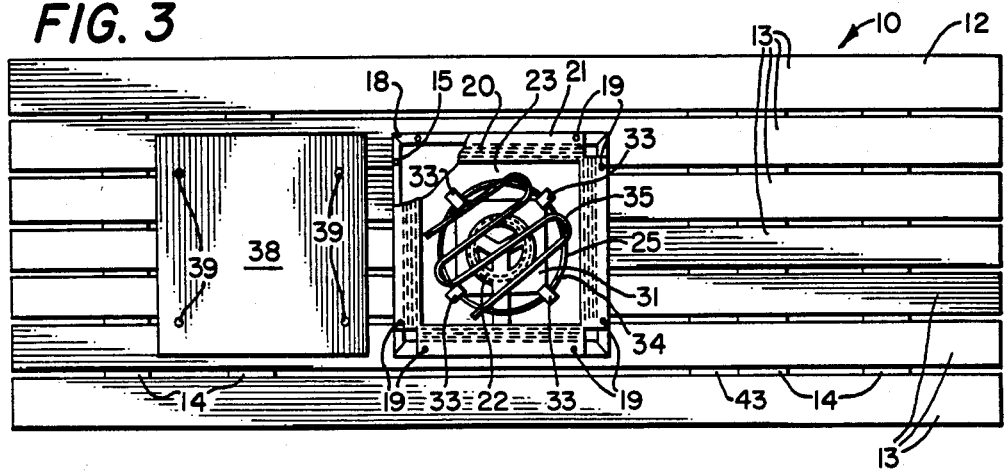
Figure 4:
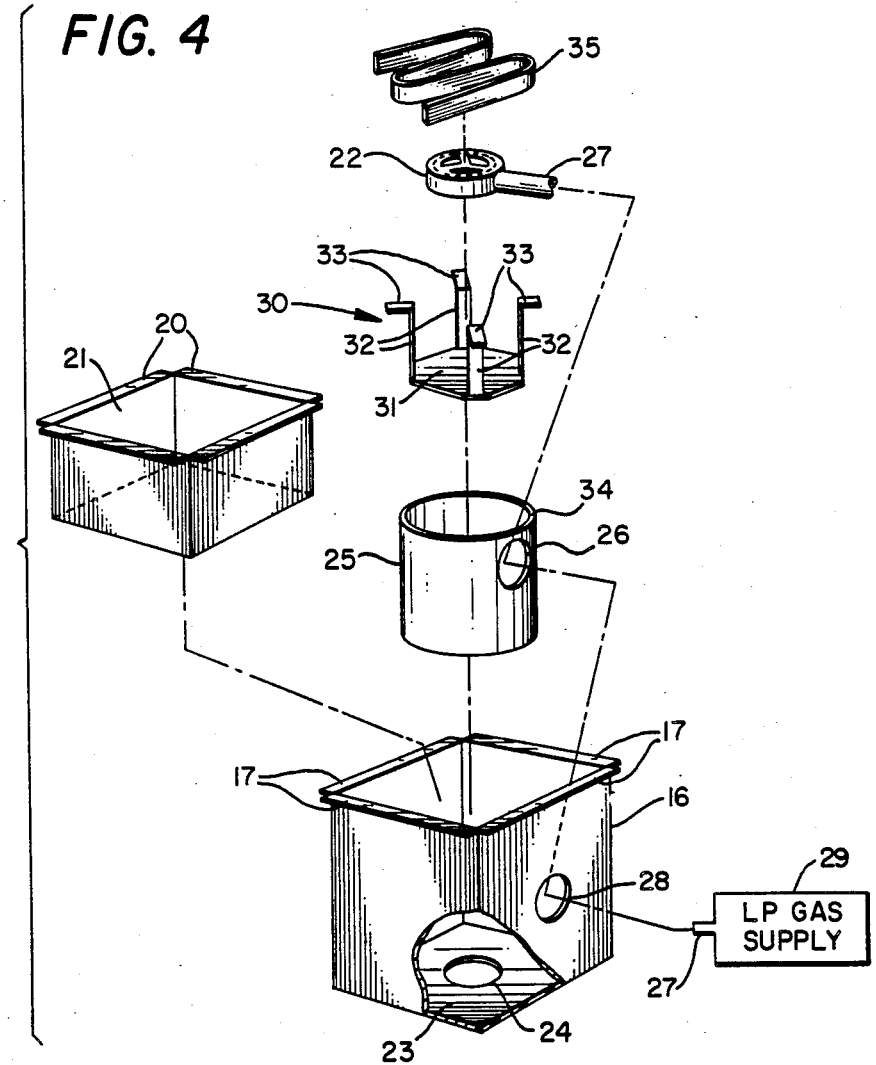

In the drawings:

FIG. 1 represents a perspective view of a picnic table equipped with a deep fat frying pot cooker box having a food chopping board top;

FIG. 2, a side elevation view of the picnic table with a cooker box and the propane gas bottle fuel source for the cooker;

FIG. 3, a top plan view of the picnic table with a cooker box of FIGS. 1 and 2; and FIG. 4, an exploded view of the cooker box, burner, and burner support elements.

Referring to the drawings:

The picnic table 10 of FIGS. 1, 2 and 3 is shown to be equipped with sturdy opposite end retractable support leg assemblies 11L and 11R that support table top 12 above the ground. The table top 12 is formed of longitudinal wood slabs 13 (two by four slabs for example) mounted on top of transverse cross beams 14 to which they are fastened as by nails, screws or pegs (detail not shown). A cut out square opening 15 is provided in the table top 12 through which a cooker box 16 extends. The cooker box 16 is formed from sheet metal that is a cooker support box formed with outwardly extended flanges 17 that overlap the top of a square frame 18 of wood and fastened thereto as by screws 19. The screws 19 also extend through flanges 20 of metal heat shield 21 that extends down into box 16 to approximately the level of burner 22 with flanges 20 fastened in place overlapping the box flanges 17. Heat shield 21 is sized to provide air space between the walls thereof and the walls of cooker box 16. The bottom wall 23 of box 16 is provided with an opening 24 to supply supplimental air to burner 22 and for drainage of water from the box 16 when any water finds its way therein.

Cylindrical gas burner element holder 25 that is supported on bottom wall 23 of box 16 is provided with a side inlet air opening 26 that also serves for passage of propane gas line 27 therethrough that is also passed through air inlet side opening 28 of box 16 in connecting the propane bottle 29 to burner 22. A gas burner 22 element support member 30 has a bottom plate 31 and upward extensions 32 with top end outwardly extended flanges 33 that overlap the top rim 34 of the cylindrical holder 25 to thereby support the support member 30 and the gas burner 22 down in the holder 25 in alignment with opening 26. The serpentine cooking grill 35 rests on the top rim 34 of the cylindrical holder 25 to support a deep fat fry pot 36 with the pot bottom 37 well down in the cooker box 16 from which position it would be difficult to tip over even if a person were to bump the table 10 quite hard. The cover 38 formed of wood has four pegs 39 that fit down within corners of the heat shield 21 when the cover 38 is put in place over the top of box 16 when the fry pot 36 is removed. The cover 38 also serves as a food chopping block when placed on the table top with the pegs 39 extending down into crack space between table top wood slabs 13. Thus the pegs 39 serve a dual function helping to hold the cover 38 in place on the top of the box 16 and stabilizing the cover in place on the table top when it is at rest there and when being used as a chopping block. The propane bottle 29 is mounted with a chain 40 connected from top handle 41 to an eye bolt 42 fastened to a beam or block of wood 43 fastened to the bottom of the table top 12.

Whereas this invention has been described with respect to a single embodiment thereof, it should be realized that various changes may be made without departure from the essential contributions to the art made by the teachings hereof.

I claim:

1. A table mounted pot cooker comprising: a box like rectangular metal enclosure with an open top, four sides and a bottom; a table with opposite end legs and a table top with a rectangular opening sized to receive said box like rectangular metal enclosure; a rectangular frame resting on the table top around said rectangular opening; said rectangular metal enclosure having top flanges extending out over the top of said rectangular frame to support said rectangular metal enclosure extending from above said table top through said table top rectangular opening to below the table top; a gas burner element; a cylindrical gas burner element holder with a bottom supported on the bottom of said box like rectangular metal enclosure; a gas burner element support plate with upward extensions having outwardly extended flanged tops that overlap the top of said cylindrical gas burner element holder to support said gas burner element down in the cylindrical gas burner element holder; inflammable gas line means extended from an inflammable gas container to said gas burner element; grill means resting on the top of said cylindrical gas burner element holder; opening means in said box like rectangular metal enclosure, and opening means in the side of said cylindrical gas burner element holder for flow of inlet air to said gas burner and passage of said inflammable gas line means through from the exterior of said enclosure to said gas burner element.

2. The table top mounted pot cooker of claim 1, wherein a cover formed of wood is provided shaped and sized to cover the open top of said box like rectangular metal enclosure; and four pegs attached to and projecting down from said cover into corner areas of said top opening when said cover is placed on the top of said box like metal enclosure as an aid to holding the cover in place on the top of said box like rectangular metal enclosure.

3. The table top mounted pot cooker of claim 2, wherein said table top is formed of longitudinal wood slabs with crack spaces between adjacent longitudinal wood slabs of the table top.

4. The table top mounted pot cooker of claim 3, wherein said crack spaces are of such width and so spaced as to receive the four pegs of said cover as an aid in stabilizing the cover in place on the table top when it is at rest there and when being used as a food chopping block on the table top.

5. The table top mounted pot cooker of claim 4, wherein said box like rectangular enclosure with an open top is provided with a rectangular metal heat shield sized to provide air space between the walls thereof and the walls of said enclosure and extend down into said enclosure to approximately the level of said gas burner element; and with metal heat shield top edge flanges extending outwardly to overlap said top flanges of said rectangular enclosure.

6. The table top mounted pot cooker of claim 5, wherein said rectangular frame resting on the table top around said rectangular opening is a rectangular wood frame; and fastening screws extend through metal heat shield top edge flanges and top flanges of said rectangular enclosure into said rectangular wood frame.

7. The table top mounted pot cooker of claim 6, wherein said four pegs projecting down from said cover are close snug fits in the corners of said rectangular metal heat shield.

8. The table top mounted pot cooker of claim 1, wherein said box like rectangular enclosure with an open top is provided with a rectangular metal heat shield sized to provide air space between the walls thereof and the walls of said enclosure and extend down into said enclosure to approximately the level of said gas burner element; and with metal heat shield top edge flanges extending outwardly to overlap said top flanges of said rectangular enclosure.

9. The table top mounted pot cooker of claim 8, wherein said rectangular frame resting on the table top around said rectangular opening is a rectangular wood frame; and fastening screws extend through metal heat shield top edge flanges and top flanges of said rectangular enclosure into said rectangular wood frame.

10. The table top mounted pot cooker of claim 9, wherein said opening means in said box like rectangular metal enclosure includes an opening in a side of said box like rectangular metal enclosure; and an opening on the bottom of said box like rectangular metal enclosure.

11. The table top mounted pot cooker of claim 10, wherein said rectangular metal enclosure, said rectangular opening in the table top, and said rectangular frame are substantially square.

12. The table top mounted pot cooker of claim 11, wherein said gas burner element support plate supports said gas burner element substantially in alignment with said opening in a side of said box like rectangular metal enclosure.

13. The table top mounted pot cooker of claim 12, wherein said opening means in the side of said cylindrical gas burner element holder is an opening substantially at the same level as said gas burner element and said opening in a side of said box like rectangular metal enclosure.

14. The table top mounted pot cooker of claim 13, wherein said grill means is a single serpentine bent strip of metal.

15. The table top mounted pot cooker of claim 13, wherein said inflammable gas container is a gas bottle with top holding means; and a chain fastened to said top holding means extended to and fastened to the bottom of said table top via fastening means.

16. The table top mounted pot cooker of claim 15, wherein the table mounting the pot cooker is large enough to function as a picnic table with considerable table top area toward both ends of the table from the pot cooker and to opposite sides of the table from the pot cooker.

* * * * *